United States Patent [19]
Kobayashi et al.

[11] 3,947,818
[45] Mar. 30, 1976

[54] BUS-COUPLER

[75] Inventors: Yoshiki Kobayashi; Tadaaki Bandoh; Toshitaka Hara, all of Hitachi, Japan

[73] Assignee: Hitachi, Ltd., Japan

[22] Filed: Dec. 9, 1974

[21] Appl. No.: 531,161

[30] Foreign Application Priority Data
Dec. 14, 1973 Japan............................ 48-138610

[52] U.S. Cl.................... 340/147 LP; 340/147 SY
[51] Int. Cl.²............................................ H04Q 9/00
[58] Field of Search........ 340/147 LP, 147 SY, 152; 179/15 A

[56] References Cited
UNITED STATES PATENTS

| | | | |
|---|---|---|---|
| 3,300,758 | 1/1967 | Hawley | 340/147 LP |
| 3,818,447 | 6/1974 | Craft | 340/147 LP |
| 3,832,689 | 8/1974 | Means | 340/174 LP |

*Primary Examiner*—Harold I. Pitts
*Attorney, Agent, or Firm*—Craig & Antonelli

[57] ABSTRACT

A bus-coupler or bus window in an information transport system for connecting a plurality of buses, to each of which a plurality of arithmetic units, a plurality of memory or storage units and a plurality of input-output units are connected separately through stations. The bus coupler includes a dead-lock control circuit for preventing a dead-lock which could possibly occur in communication between the buses.

4 Claims, 3 Drawing Figures

BUS-COUPLER

BACKGROUND OF THE INVENTION

1. Field of the Invention

The present invention relates in general to an apparatus for controlling communications among computer systems wherein a plurality of arithmetic units, memory or storage units and input-output units are coupled to associated buses for mutual communication and in particular to an inter-bus coupling control apparatus for effecting the communications among the computer systems through the buses with a minimized number of required hard wares. More specifically, the present invention concerns a dead-lock control apparatus for excluding dead-locks which may possibly occur in the communications among the buses.

2. Description of the Prior Art

Lately, a so-called multi-computer system in which a plurality of computers are interconnected in a network is employed in an effort to enhance the reliability as well as the processing capability of the computer.

However, because the communications between the computers through the buses can not be effected more than one at a time, there arises a disadvantage in the system composed of more than two computers that the throughput of the overall system is reduced. To evade such disadvantage, it is conceivable that the system comprising a plurality of computers is divided into more than two subsystems which are adapted to operate independently of one another and are coupled to one another only when communications are desired among the different subsystems.

In the hitherto known systems, the communication between the buses, i.e. the inter-bus communication is performed with the aid of a computer by utilizing the buses to which a plurality of arithmetic units, storage units and the input-output units are connected. This system is certainly advantageous in that a flexiblity as well as a wide utility for general purposes can be attained in the control of the communication between the subsystems. However, it can not be evaded from such disadvantages that a large quantity of hard wares are required and, besides, a considerable time is necessary for the control of the communication due to the fact that the communications among the subsystems are realized through the computer.

On the other hand, in the prior known inter-bus coupler apparatus of a simplified configuration in which the hard wares required for controlling the performance of the inter-bus communication and the time for controlling the communication between the buses, are minimized, there is a drawback that a dead-lock or jamming may occur, when the requests for the inter-bus communication are simultaneously called for from both buses.

SUMMARY OF THE INVENTION

An object of the present invention is to provide an apparatus which may solve the trouble of the reduction in the through-put of the multi-computer system.

Another object of the present invention is to provide an inter-bus coupling apparatus which allows reliable control for the inter-bus communication with a minimized number of required hard wares.

Further object of the invention is to provide an inter-bus coupling control apparatus which is evaded from the dead-lock likely to occur in the conventional inter-bus coupling apparatus of a small capacity constituted of a minimized number of hard wares.

These and other object of the invention have been attained by the bus-coupler which comprises means for producing a bus-coupler request signal in accordance with a request for communication from a given bus to another bus and a dead-lock control means for inhibiting dead-lock which may possibly occur in the inter-bus communication, i.e. the communication between the buses.

The other features and advantages of the invention will become more apparent by examining the following description of preferred embodiments of the invention. The description makes reference to the accompanying drawings.

DETAILED DESCRIPTIONS OF THE PREFERRED EMBODIMENTS

Figure 1:
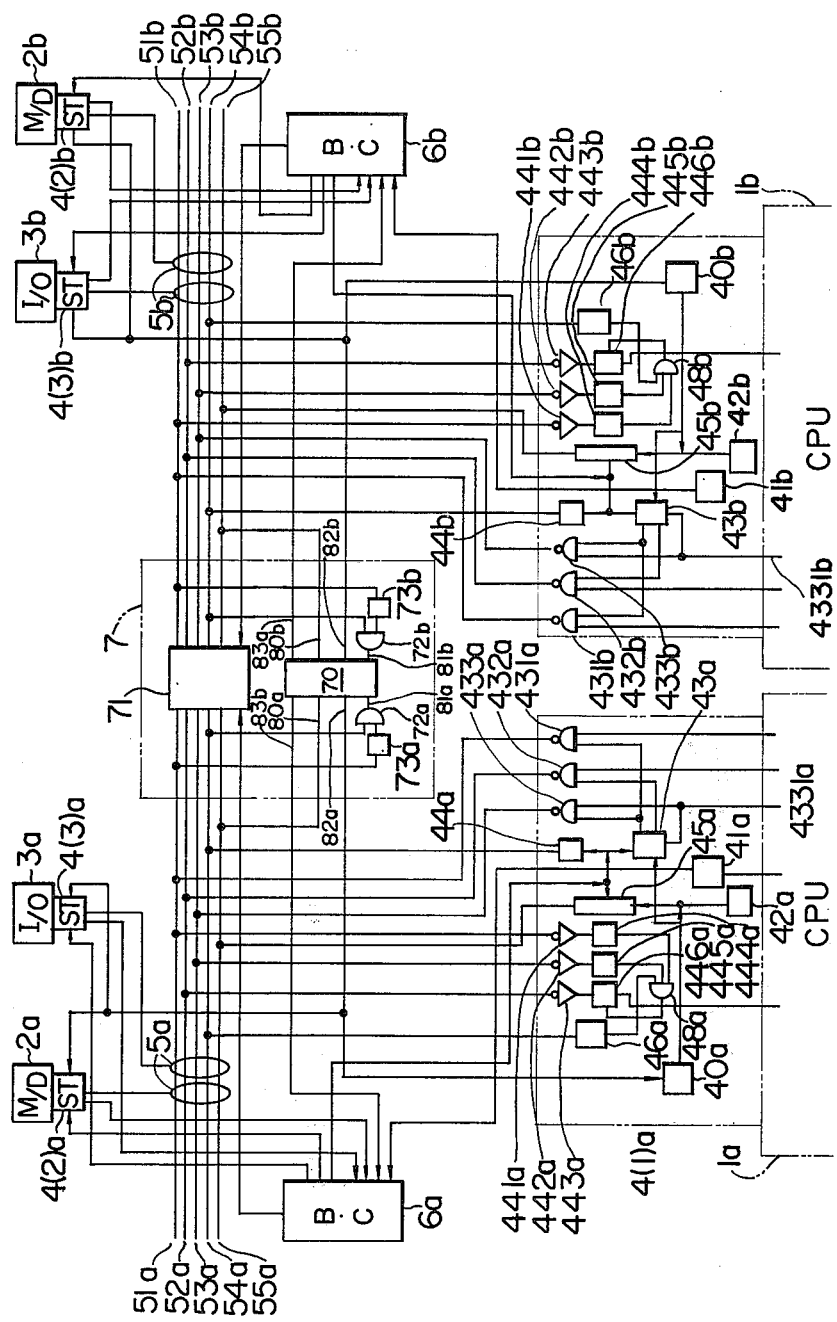
FIG. 1 is a block diagram showing an arrangement of two computer systems coupled together through a bus-coupler according to the invention.

Referring to FIG. 1, an arithmetic unit (CPU) $1a$, a memory or storage unit (M/D) $2a$ and an input-output unit (I/O) $3a$, each of which units may be provided in plurality, are coupled to an associated bus $5a$ through respective stations (ST) $4(1)a$, $4(2)a$ and $4(3)a$. A bus controller (B.C.) $6a$ is provided for each of buses to control the occupation thereof in accordance with the requests for communication from the units. The bus controller may be a part of the computer.

In FIG. 1, affixes $a$ and $b$ are attached to reference numerals to discriminate two systems coupled to the bus from each other.

In FIG. 1, an arrangement of the station is typically shown in the station block $4(1)a$, while an arrangement of a bus coupler 7 for interconnecting two buses $5a$ and $5b$ is illustrated in a dotted block 7. It is to be noted that all the stations do not necessarily have the same configuration but may incorporate therein components or arrangements unique to the individual stations.

Further, the buses $5a$ and $5b$ comprise, respectively, address lines $51a$ and $51b$, data lines $52a$ and $52b$, function lines $53a$ and $53b$, timing signal lines $54a$ and $54b$ and bus busy lines $55a$ and $55b$ which serve to signal that a requested bus is busy or occupied.

Operations of the bus coupler will be made apparent from the following description.

Assuming, for example, that a call or request for communication from one arithmetic unit $1a$ to another arithmetic unit $1b$ is produced, a communication request signal discriminator apparatus $41a$ provided in the station $4(1)a$ for discriminating the communication requests will supply a communication call or request signal to the bus controller $6a$ which responds to the communication request signal from the corresponding stations of the untis under the control thereof to allot the occupation of the bus in accordance with the priority order of the requests for communication and transmit a bus occupation authorizing signal to the station which is allowed to use the bus.

There is provided a bus busy signalling apparatus 45a in the station which also responds to the bus occupation authorizing signal to fed a bus busy signal to the bus busy line 55a of the bus 5a. So far as the bus busy signal appears in the bus busy line 55a, all the other communications through the bus 5a are inhibited. The bus occupation authorizing signal is also transmitted to a timing apparatus 44a in the station which then produces a timing signal on the timing line 54a. Further, a driver control apparatus 43a is provided in the station which receives the bus occupation authorizing signal and a function signal transmitted from a line 4331a to the function line 53a of the bus 5a to thereby produce a signal which enables drivers 431a, 432a and 433a to send the corresponding signals to the lines of the bus 5a.

In the bus-coupler 7, a comparator 73a is connected to the address signal line 51a, which comparator serves to determine whether the requested communication is to be made across two different buses and suplies an inter-bus communication request signal to one of the inputs of an AND gate 72a, which has other input connected to the timing signal line 54a of the bus 5a. The AND gate 72a thus provides timing for the inter-bus communication signal from the comparator 73a to supply the same signal to a dead-lock control apparatus 70. The function of the dead-lock control apparatus 70 is to allow the use of an inter-bus coupler apparatus 71 for the first incoming inter-bus communication request signal and at the same time to supply the bus occupation request signal to the other bus controller 6b. When an inter-bus communication request signal is supplied to the dead-lock control apparatus 70 during the use of the inter-bus coupler apparatus 71, the dead-lock control apparatus 70 will produce a bus-coupler busy signal indicating that the inter-bus coupler apparatus is being used, to thereby make the inter-bus communication request signal cancelled. In case the two inter-bus communication request signals are applied simultaneously to the dead-lock control apparatus 70, the dead-lock control apparatus 70 allows the use of the inter-bus coupler apparatus 71 for one of the inter-bus communication request signals by transmitting the bus occupation request signal to the other bus controller 6b, while the bus-coupler busy signal indicating the inter-bus coupler apparatus 71 being used is produced for the other inter-bus communication request signal, whereby the latter signal is rejected or cancelled. The arrangement as well as operations of the dead-lock control apparatus will be described in more detail hereinafter. Input lines 80a and 80b to the dead-lock control apparatus 70 serve to reset the apparatus 70, the operation of which lines will be also described in detail hereinafter in conjunction with the dead-lock control apparatus 70.

The bus controller 6b, on the other hand, receives the bus occupation request signals from the dead-lock control apparatus 70 to allow the occupation of bus for the bus occupation request signals in accordance with the priority order thereof. When a bus occupation request is once allowed, the bus occupation authorizing signal is transfered to the inter-bus coupler apparatus 71 from the bus controller 6b. The inter-bus coupler apparatus is now in the position to allow the inter-communication between two buses by interconnecting the lines of the buses. During the inter-bus communication, the bus busy signal is sent to the buses 5a and 5b, whereby other communication through the bus 5b is inhibited.

In the station of the arithmetic unit 1b which is called for the communication, a coincidence circuit 444b and a decoder 445b connected to the address line 51b and the function line 53b through respective receivers 441b and 442b will operate to determine whether the communication request is directed to themselves and provides a timing signal to an AND gate 48b through a timing control circuit 46b connected to the timing signal line 54b to produce a signal supplied to a register 446b for allowing the communication or transfer of data. It will be noted that the register 446b is connected to the data line 52b through a receiver 443b.

Upon the termination of the inter-bus communication, an apparatus 42a for discriminating the termination of communication produces a signal to clear the bus busy signal for the bus busy apparatus 45a, whereby the occupations of the bus 5a as well as the bus 5b are cleared and the system is now in the state ready for a next communication.

The bus-coupler busy signal which is produced for the inter-bus communication request signal fed to the dead-lock control apparatus 70 during the occupation of the inter-bus coupler apparatus, as hereinbefore described, is transfered to a communication request cancelling apparatus 40b which produces an output signal fed to the bus busy apparatus 45b to make the inter-bus communication request signal to be withdrawn or cancelled.

From the foregoing description, the general outline of operations of the bus coupler, the stations of the associated buses and the bus controller will be understood. Further, the manner of the communication effected through a single bus will be easily appreciated for those skilled in the art from the above description.

Next, the description will be made on the arrangement and operation of the dead-lock control apparatus 70 provided in the bus-coupler by referring to FIG. 2a, in which the reference numerals used for indicating the input and the output lines for the dead lock control apparatus are the same as those utilized in the case of FIG. 1.

Figure 2A:
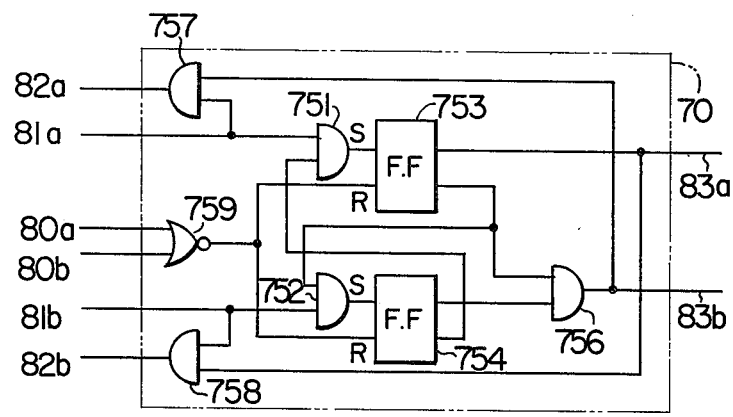
FIG. 2a is a circuit diagram to show an examplary embodiment of the dead-lock control apparatus for use in the bus-coupler according to the invention.

Referring to FIG. 2a, there are provided a first and a second flip-flops 753 and 754 each having reset input connected to the output line of a NOR gate 759 to which the bus busy lines 55a and 55b of the buses 5a and 5b are connected through reset input lines 80a and 80b so that the first and the second flip-flops 753 and 754 are reset by the reset inputs from these lines 80a and 80b. In this way, these flip-flops are reset upon the termination of the bus busy signal.

When the inter-bus communication request signal from the AND gate 72a appears on the input line 81a, this signal is applied to the input of a first AND gate 751 together with the reset output from the second flip-flop 754. The first AND gate 751 then produces an output signal applied to the set input of the first flip-flop 753 to thereby set the latter, which in turn produces the bus occupation request signal for the bus 5b from the set output thereof to the output line 83a. In this state, when another inter-bus communication request signal appears subsequently on the input line 81b, this signal is applied to one input of the second AND gate 752. However, since the other input of the AND gate 752 is connected to the reset output of the first flip-flop 753 which is in the set state, the second AND gate 752 will produce no output signal, whereby the second flip-flop 754 remains in the reset state. The inter-bus communication request signal appearing on the input line 81b is, on the other hand, applied to one input of a fifth AND gate 758 which has other input coupled to the set output of the first flip-flop 753. The fifth AND gate 758 thus produces the bus-coupler busy signal on the output line 82b. Upon the termination of the inter-bus communication, the first and the second flip-flop circuits are both reset by the signals on both the bus busy lines 80a and 80b.

To the contrary, when the inter-bus communication request signal from the AND gate 72b incomes to the dead-lock control apparatus 70 through the input line 81b, the second AND gate 752 applied at its inputs with the inter-bus communication request signal and the reset signal from the first flip-flop circuit 753 is enabled to produce an output signal which resets the second flip-flop 754. As a result, the third AND gate 756 is applied with the set output from the second flip-flop 754 and the reset output from the first flip-flop 753 to thereby output the bus occupation request signal for the bus 5a on the output line 83b. When another inter-bus communication request signal appears subsequently on the input line 81a, the signal is applied to one input of the first AND gate 751. However, since the other input of this gate 751 is connected to the reset output of the second flip-flop 754 which is in the set state, the first AND gate 751 is not enabled. On the other hand, the fourth AND gate 757 having inputs connected to the input line 81a and the output line 83b can produce the bus-coupler busy signal on the output line 82a to the communication request cancelling apparatus 40a. When the communication between buses is terminated, both of the first and the second flip-flops 753 and 754 are reset by the signals on both the bus busy lines 80a and 80b.

Figure 2B:
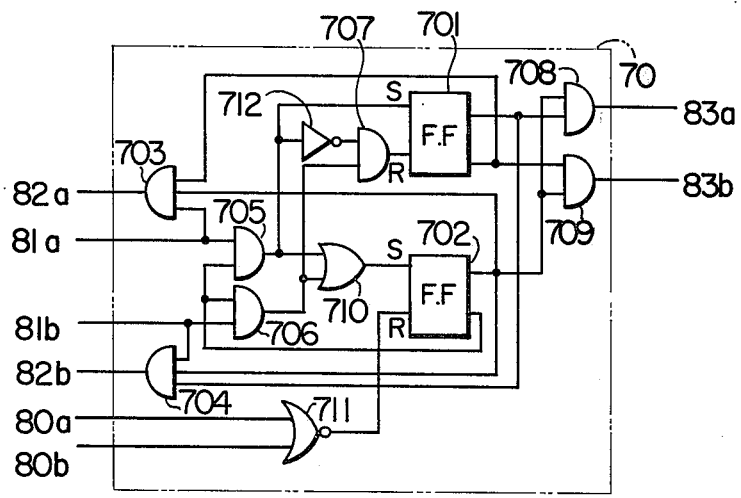
FIG. 2b is a circuit diagram to show another exemplary embodiment of the dead-lock control apparatus for use in the bus-coupler according to the invention.

FIG. 2b shows another embodiment of the dead-lock control apparatus according to the present invention. In this drawing, same reference numerals as those in FIG. 1 are used to designate the input and the output lines for the dead-lock control apparatus.

Referring to FIG. 2b, the bus busy lines 55a and 55b of the buses 5a and 5b are connected to a NOR gate 711 through the input lines 80a and 80b, which NOR gate has an output connected to the reset input of a first flip-flop circuit 702. There is provided also a second flip-flop 701 which may be in the set or reset state, as will be understood from the following description on the operation.

Assuming that the second flip-flop circuit 701 is in the reset state and the inter-bus communication request signal appears on the input line 81a, a first AND gate 705 having inputs connected to the input line 81a and the reset output of the first flip-flop 702 will produce an output signal which sets the second flip-flop 701. Simultaneously, an OR gate 710 applied with the output signal from the first AND gate 705 produces an output signal which is fed to the first flip-flop 702 to set it, while a fourth AND gate 708 adapted to receive the set outputs from the first and the second flip-flops will produce the bus occupation request signal for the bus 5b on the output line 83a. The fifth AND gate 709 having inputs connected to the reset output of the second flip-flop 701 and the set output of the first flip-flop 702 will produce no output signal. In this state, a delayed appearance of another inter-bus communication request signal on the input line 81b can not enable the second AND gate 702 having an input connected to the input line 81b, since the other input of the AND gate 706 is connected to the reset output of the first flip-flop 702 which is set at that time. On the other side, a seventh AND gate 704 having inputs connected to the input line 81b, the set output of the first flip-flop 702 in the set state and the set output of the second flip-flop 701 also in the set state can produce the bus coupler busy signal on the output line 82b. Upon termination of the communication between buses, signals on the bus busy lines 80a and 80b will reset the first flip-flop circuit 702.

Next, it is assumed that the inter-bus communication request signal appears on the input line 81b when the second flip-flop 701 is in the set state. Then, the second AND gate 706 receives the inter-bus communication request signal and the reset signal of the first flip-flop circuit 702 which is in the reset state, to thereby produce an output signal which will set the first flip-flop 702 through the OR gate 710. On the other hand, the first AND gate 705 having an input applied with the reset signal from the first flip-flop circuit 702 which is now in the set state will produce no output, which results in the production of an output signal from a NOT gate 712 connected to the output of the first AND gate 705. The output from the NOT gate 712 is applied to the third AND gate 707 together with the output from the second AND gate 706, whereby an output signal is produced by the third AND gate 707 to reset the second flip-flop circuit 701. The fourth AND gate 708 destined to receive the set outputs of the second flip-flop 701 in the reset state and the first flip-flop in the set state produced no output, while the fifth AND gate 709 can respond to the reset output from the second flip-flop 701 in the reset state and the set output from the first flip-flop 702 to thereby produce the bus occupation request signal for the bus 5a on the output line 83b. In this state, another inter-bus communication signal appearing lately on the input line 81a will be applied to an input of the first AND gate 705 which, however, is not enabled, since the other input thereof is connected to the reset output of the first flip-flop circuit 702 in the set state. On the other hand, the sixth AND gate 703 having inputs connected to the input line 81a, the set output of the first flip-flop 702 in the set state and the reset output of the second flip-flop 701 in the reset state can produce the bus-coupler busy signal on the output line 82a. When the inter-bus communication comes to the end, the first flip-flop circuit 702 is then reset by the signal on both the bus busy lines 80a and 80b.

I claim:
1. A bus-coupler in an information transport system for connecting a plurality of buses, to each of which a plurality of arithmetic units, a plurality of storage units and a plurality of input-output units are connected through respective associating stations, comprising:
   first means provided for each of the buses for generating a first signal in response to an inter-bus communication request signal from one of the associating stations of each of the buses;
   second means generating a second signal requiring occupation of one of the other buses in response to the first incoming first signal from one of said first means of the one bus and for generating third signals rejecting the inter-bus communication request signal from respective ones of the associating stations of the other buses in response to the succeedingly incoming first signals from others of said first means of the other buses, and when at least two of the first signals occur simultaneously, said second means generating a second signal requiring occupation of one of the other buses in response to one of the at least two first signals from one of said first means of the one bus and also generating third signals rejecting the inter-bus communication request signals from respective ones of the associating stations of the other buses in response to the others of the at least two first signals from others of said first means of the other buses;

third means for interconnecting the one bus with the one of other buses in response to the second signal from said second means; and fourth means provided for each of the buses for cancelling the inter-bus communication request signals from the respective ones of the associating stations of the other buses in response to the third signals from said second means.

2. A bus-coupler in an information transport system for connecting a pair of buses, to each of which a plurality of arithmetic units, a plurality of storage units and a plurality of input-output units are connected through respective associating stations, comprising:

a bus controller provided for each of the buses for registering communication request signals from the associating stations of one bus and for generating an authorization signal allowing occupation of the one bus for one of the associating stations in accordance with priority order of the communication request signals from the associating stations;

a driver control apparatus provided in each of the associating stations for sending a group of signals to the one bus in response to the authorization signal from said bus controller;

a comparator provided for each of the buses for discriminating an inter-bus communication request signal from the group of signals from the one of said drive control apparatuses and generating a first signal requiring inter-bus communication with one of the associating stations of the other bus;

a dead-lock control apparatus for generating a second signal allowing occupation request for the other bus in response to the first incoming first signal from one of said comparators and generating a third signal rejecting occupation request for the one bus in response to the succeedingly incoming first signal from the other of said comparators, and when the two first signals simultaneously occur, said dead-lock control apparatus generating a second signal allowing occupation request for the other bus in response to one of the two first signals from one of said comparators and also generating a third signal rejecting occupation request for the one bus in response to the other of the two first signals from the other of said comparators, said bus controller further generating a fourth signal authorizing occupation of the other bus in response to the second signal from said dead-lock control apparatus;

a communication request cancelling apparatus for cancelling the inter-bus communication request signal from one of the associating stations of the other bus in response to the third signal from said dead-lock control apparatus; and an inter-bus coupler apparatus for connecting the one bus with the other bus in response to the fourth signal from said bus controller of the other bus.

3. A bus-coupler as set forth in claim 2, wherein said dead lock control apparatus comprises:

a bus busy line provided for each of the buses to which a bus busy signal of the group of signals is fed during the occupation of the buses from one of the associating stations of the buses;

a NOR gate having an input applied with the bus busy signal from said bus busy line of the one bus;

a first AND gate having an input applied with first signal from the one bus;

a first flip-flop circuit having a set output connected to the output of said first AND gate, a reset input connected to the output of said NOR gate and a set output producing the second signal allowing occupation request for the other bus;

a second AND gate having inputs applied with the first signal from the other bus and the reset output from said first flip-flop circuit;

a second flip-flop circuit having a set input connected to the output of said second AND gate and a reset input connected to the output of said NOR gate for producing a reset output applied to the other input of said first AND gate;

a third AND gate having inputs applied with the reset output from said first flip-flop circuit and the set output from said second flip-flop circuit for producing the second signal allowing occupation request for the one bus;

a fourth AND gate having inputs applied with the output of said third AND gate and the first signal from the one bus for producing the third signal rejecting occupation request for the other bus;

a fifth AND gate having inputs applied with the set output from said first flip-flop and the first signal from the other bus for producing the third signal rejecting occupation request for the one bus.

4. A bus-coupler as set forth in claim 2, wherein said dead-lock control apparatus comprises:

a bus busy line provided for each of the buses to which a bus busy signal of the group of signals is fed during the occupation of the buses from one of the associating stations of the buses;

a NOR gate having an input applied with the bus busy signal from said bus busy line of the one bus;

a first AND gate having an input applied with the first signal from the one bus;

a second AND gate having an input applied with the first signal from the other bus;

an OR gate having inputs applied with outputs from said first and second AND gates;

a first flip-flop circuit having a set input connected to the output of said OR gate and a reset input connected to the output of said NOR gate for producing a reset output applied to the other inputs of said first and second AND gates, respectively;

a NOT gate for negating the output of said first AND gate;

a third AND gate having inputs applied with the output of said NOT gate and the output of said second AND gate;

a second flip-flop circuit having a set input connected to the output of said first AND gate, a reset input connected to the output of said third AND gate;

a fourth AND gate having input applied with the sey output of said first flip-flop circuit and the set output of said second flip-flop circuit to thereby produce the second signal allowing occupation request for the other bus;

a fifth AND gate having inputs applied with the set output of said first flip-flop circuit and the reset output of said second flip-flop circuit to thereby produce the second signal allowing occupation request for the one bus;

a sixth AND gate having inputs applied with the reset output of said second flip-flop circuit, the set output of said first flip-flop circuit and the first signal from the one bus to thereby produce the third signal rejecting occupation request for the other bus;

a seventh AND gate having inputs applied with the set output of said second flip-flop circuit, the set output of said first flip-flop circuit and the third signal rejecting occupation request for the one bus.

* * * * *